(12) United States Patent
Sasaki et al.

(10) Patent No.: US 9,151,233 B2
(45) Date of Patent: Oct. 6, 2015

(54) VEHICLE CONTROLLER

(71) Applicant: DENSO CORPORATION, Kariya, Aichi-pref. (JP)

(72) Inventors: Taketsugu Sasaki, Nagoya (JP); Shuhei Oe, Nukata-gun (JP); Masanori Sugiura, Chiryu (JP); Takashi Satoh, Okazaki (JP); Motoyoshi Hatta, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 14/078,069

(22) Filed: Nov. 12, 2013

(65) Prior Publication Data

US 2014/0136086 A1    May 15, 2014

(30) Foreign Application Priority Data

Nov. 14, 2012    (JP) ................. 2012-250617

(51) Int. Cl.
*F02D 29/02* (2006.01)
*F02D 13/02* (2006.01)
(Continued)

(52) U.S. Cl.
CPC ............ *F02D 29/02* (2013.01); *F02D 13/0215* (2013.01); *F02D 13/0261* (2013.01); *F02D 41/0005* (2013.01); *F02D 41/0055* (2013.01); *F02D 41/123* (2013.01); *F02D 2041/001* (2013.01); *F02D 2041/1431* (2013.01); *F02D 2250/41* (2013.01); *F02M 25/0715* (2013.01); *F02M 35/10229* (2013.01); *Y02T 10/18* (2013.01); *Y02T 10/42* (2013.01); *Y02T 10/47* (2013.01)

(58) Field of Classification Search
CPC ..... F02D 41/0087; F02D 13/06; F02D 17/02; F02D 13/0261; F02D 43/04; F02D 29/02; F01L 2013/001
See application file for complete search history.

(56) References Cited

U.S. PATENT DOCUMENTS 5,899,828 A * 5/1999 Yamazaki et al. ................ 477/4
6,138,784 A   10/2000 Oshima et al.
(Continued)

FOREIGN PATENT DOCUMENTS

JP     8-100689     4/1996
JP     2001-182587  7/2001
(Continued)

OTHER PUBLICATIONS

Japanese Patent Office, "Notification of Reason(s) for Refusal," (3 pages) issued in connection with Japanese Patent Application No. 2012-250617, dated Aug. 3, 2015, with its English language Translation (5 pages).

*Primary Examiner* — Stephen K Cronin
*Assistant Examiner* — Xiao Mo
(74) *Attorney, Agent, or Firm* — Nixon & Vanderhye P.C.

(57) ABSTRACT

A vehicle controller performs a throttle-valve-late-close control in which the throttle valve is held open until a delay time has passed after the fuel cut is started, and an EGR-valve-open-close control in which the EGR valve is repeatedly opened and closed. Then, the throttle valve is closed and the EGR valve is opened. In a period from a latter period of an exhaust stroke to a preceding period of an intake stroke, a valve-overlap control is executed so that a variable valve timing controller is controlled to make both an intake valve and an exhaust valve opened. A pumping loss of an engine is sufficiently reduced and an energy-regenerate efficiency can be effectively improved.

9 Claims, 8 Drawing Sheets

(51) Int. Cl.
  *F02D 41/12*   (2006.01)
  *F02D 41/00*   (2006.01)
  *F02M 35/10*   (2006.01)
  *F02M 25/07*   (2006.01)
  *F02D 41/14*   (2006.01)

(56) References Cited

U.S. PATENT DOCUMENTS

| 2003/0160455 A1* | 8/2003 | Hu et al. | 290/40 C |
| 2006/0086546 A1* | 4/2006 | Hu et al. | 180/65.2 |
| 2010/0070122 A1 | 3/2010 | Niimi | |
| 2010/0235074 A1 | 9/2010 | Shinagawa et al. | |

FOREIGN PATENT DOCUMENTS

| JP | 2003-269202 | 9/2003 |
| JP | 2004-204747 | 7/2004 |
| JP | 2007-262956 | 10/2007 |
| JP | 2010-007532 | 1/2010 |
| JP | 2011-214413 | 10/2011 |

* cited by examiner

VEHICLE CONTROLLER

CROSS-REFERENCE TO RELATED APPLICATION

This application is based on Japanese Patent Application No. 2012-250617 filed on Nov. 14, 2012, the disclosure of which is incorporated herein by reference.

TECHNICAL FIELD

The present disclosure relates to a vehicle controller which performs an energy regeneration in which a kinetic energy of a vehicle is regenerated by converting the kinetic energy into an electrical energy by an alternator when an internal combustion engine is in a fuel cut.

BACKGROUND

In recent years, in a vehicle provided with an internal combustion engine, a kinetic energy of vehicle is regenerated by converting the kinetic energy into an electrical energy by an alternator when an internal combustion engine is decelerated in a fuel cut. The recovered electrical energy is charged in a battery.

However, when the vehicle is decelerated and a throttle valve is closed so that an intake air pressure is decreased, a pumping loss of the internal combustion engine is increased. Corresponding to this pumping loss, an energy loss is increased and an energy-regenerate efficiency is deteriorated.

To solve the above issue, as shown in JP-H-8-100689A, in a system having an EGR apparatus for recalculating a part of an exhaust gas into an intake pipe, an EGR valve is opened to recalculate an EGR gas into the intake pipe to decrease an intake air pressure when the vehicle is decelerated. Thereby, the pumping loss of the internal combustion engine is decreased, and the energy-regenerate efficiency is improved.

However, even if the EGR valve is opened when the vehicle is decelerated in fuel-cut, the pumping loss can not be decreased enough and the energy-regenerate efficiency is not sufficiently improved.

SUMMARY

It is an object of the present disclosure to provide a vehicle controller which can effectively improve an energy-regenerate efficiency in a system where a kinetic energy of a vehicle is regenerated by converting the kinetic energy into an electrical energy by an alternator when an internal combustion engine is decelerated in a fuel cut.

A vehicle controller performs an energy regeneration in which a kinetic energy of a vehicle is regenerated by converting the kinetic energy into an electrical energy by an alternator when an internal combustion engine is in a fuel cut. The vehicle controller includes a throttle valve which adjusts an intake air flow rate of the internal combustion engine; an EGR valve which controls an exhaust gas quantity recalculating from an exhaust passage into an intake passage through an EGR passage; and a variable valve timing controller which varies a valve timing of at least one of an intake valve and an exhaust valve of the internal combustion engine. Further, the vehicle controller includes a fuel-cut-control portion performing a fuel-cut-coordination control. In the fuel-cut-coordination control, the throttle valve is closed, the EGR valve is opened, and the variable valve timing controller is controlled so that a pumping loss of the internal combustion engine is decreased when the internal combustion engine is in the fuel cut.

When the engine is in the fuel cut, the throttle valve is closed and the EGR valve is opened, so that the EGR gas is recalculated into the intake passage and an intake pressure drop can be avoided while cold fresh intake air is not introduced into the engine. Thereby, the pumping loss of the engine can be reduced and the temperature decrease of the catalyst can be restricted. Furthermore, the variable valve controller is controlled to reduce a pumping-loss. Thus, the pumping loss of the engine is sufficiently reduced and the energy-regenerate efficiency can be effectively improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present invention will be described, hereinafter.

First Embodiment

Referring to FIGS. 1 to 9, a first embodiment will be described hereinafter.

Figure 1:
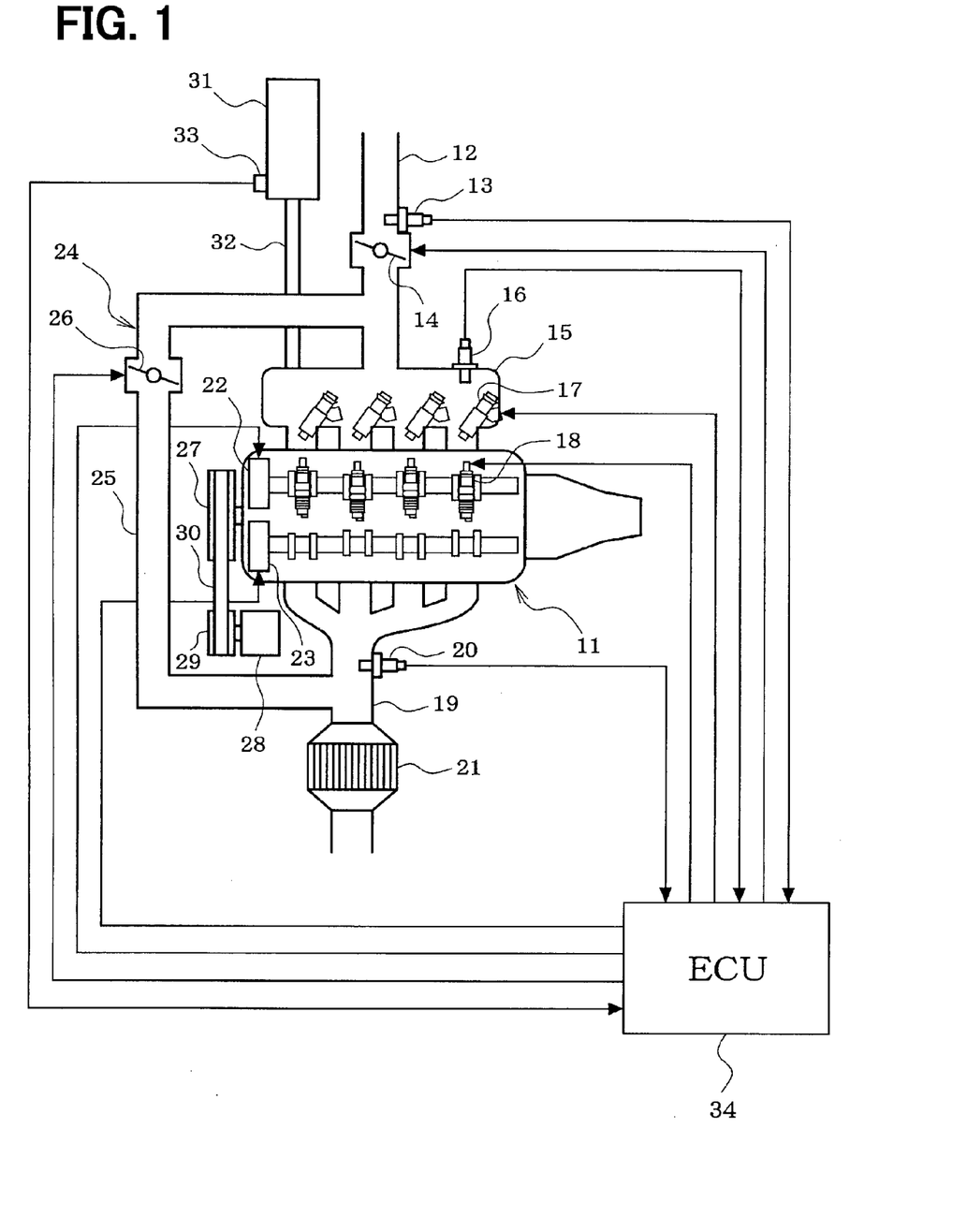
FIG. 1 is a schematic view of an engine control system according to a first embodiment of the present invention.

First, referring to FIG. 1, an engine control system is explained. A vehicle is provided with an engine 11 as a power source of a vehicle. An airflow meter 13 detecting an intake air flow rate is arranged in an intake pipe 12 (intake passage). A throttle valve 14 is arranged downstream of the airflow meter 13 to adjust the intake air flow rate. An opening degree of the throttle valve 14 is adjusted by an actuator such as a motor (not shown).

A surge tank 15 including an intake air pressure sensor 16 is provided downstream of the throttle valve 14. The intake air pressure sensor 16 detects intake air pressure in the intake pipe 12. Moreover, a fuel injector 17 performing an inlet port injection (or cylinder injection) is provided to each cylinder of the engine 11. An ignition plug 18 is provided on a cylinder head of the engine 11 for each cylinder. When the ignition plug 18 of each cylinder generates spark discharge, an air-fuel mixture in each cylinder is ignited.

An air fuel ratio sensor 20 which detects the air-fuel ratio of the exhaust gas is respectively provided in each exhaust pipe 19 (exhaust passage) of the engine 11, and a three-way catalyst 21 which purifies the exhaust gas is provided downstream of the air fuel ratio sensor 20. Also, the engine 11 is provided an intake-side variable valve timing controller 22 which adjusts a valve timing of an intake valve (not shown), and an exhaust-side variable valve timing controller 23 which adjusts a valve timing of an exhaust valve (not shown).

Further, the engine 11 is provided with an exhaust gas recirculation (EGR) apparatus 24 for recalculating a part of exhaust gas from an exhaust pipe 19 into the intake pipe 12. The EGR apparatus 24 has an EGR pipe (EGR passage) 25 connecting the exhaust pipe 19 upstream of the catalyst 21 and the intake pipe 12 downstream of the throttle valve 14. An EGR valve 26 is disposed in the EGR pipe 25 to adjust an EGR gas quantity. An opening degree of the EGR valve 26 is adjusted by an actuator such as a motor (not shown). When the EGR valve 26 is opened, the EGR gas is recalculated into the intake pipe 12 from the exhaust pipe 19 through the EGR pipe 25.

In the present embodiment, when the engine 11 performs the fuel-cut (fuel injection is stopped), it is necessary to control the EGR valve 26 to increase the EGR gas quantity more than a case where the fuel injection is performed. Thus, the EGR apparatus 24 has the EGR pipe 25 and the EGR valve 26 of which diameters are made larger. For example, when the EGR valve 26 is fully opened, the intake pipe pressure can be atmospheric pressure.

A pulley 27 connected to a crankshaft of the engine 11, and a pulley 29 connected to a rotation axis of an alternator 28 are connected to each other through a belt 30, so that an engine power drives the alternator 28 to generate electricity.

A negative-pressure-introduction pipe 32 is connected to the surge tank 15 so that the negative pressure in the intake pipe 12 is introduced into the brake booster 31. The brake booster 31 amplifies the stepping-in force of a brake pedal (not shown) by utilizing a differential pressure between the negative pressure and the atmospheric pressure, whereby a braking force of the brake (not shown) is increased. A pressure sensor 33 which detects the negative pressure introduced into the brake booster 31 is provided to the brake booster 31.

The outputs of the above sensors are transmitted to an electronic control unit (ECU) 34. The ECU 34 includes a microcomputer which executes an engine control program stored in a Read Only Memory (ROM) to control a fuel injection quantity, an ignition timing, a throttle position (intake air flow rate) and the like.

According to the first embodiment, the ECU 34 executes an energy-regeneration-control routine (not shown), whereby a kinetic energy of the vehicle is regenerated by converting the kinetic energy into an electrical energy by an alternator 28 when an internal combustion engine 11 is in a fuel cut. The recovered electrical energy is charged in a battery (not shown)

Figure 2:
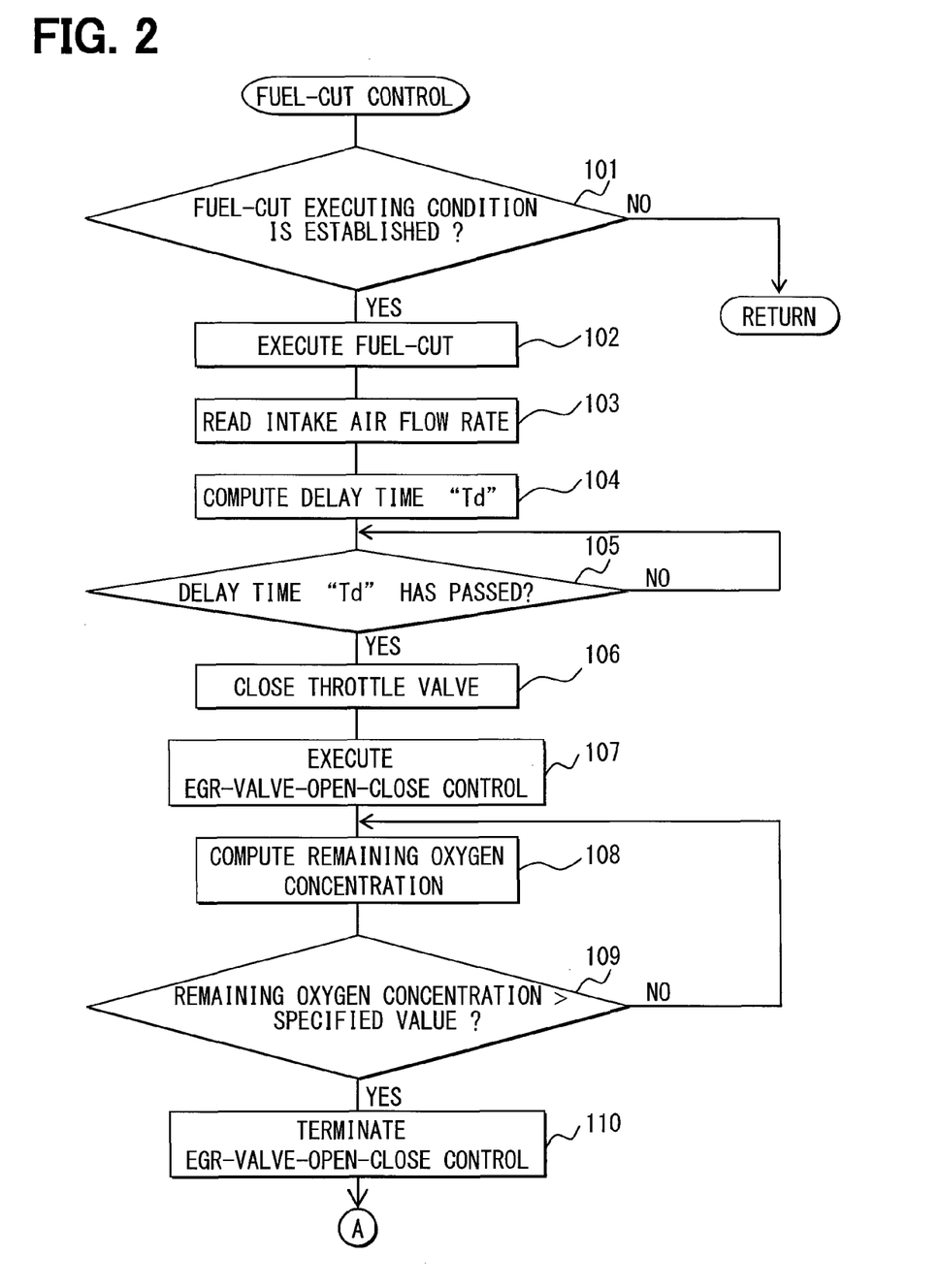
FIGS. 2 and 3 are flow charts indicating a fuel-cut control routine.
Figure 3:
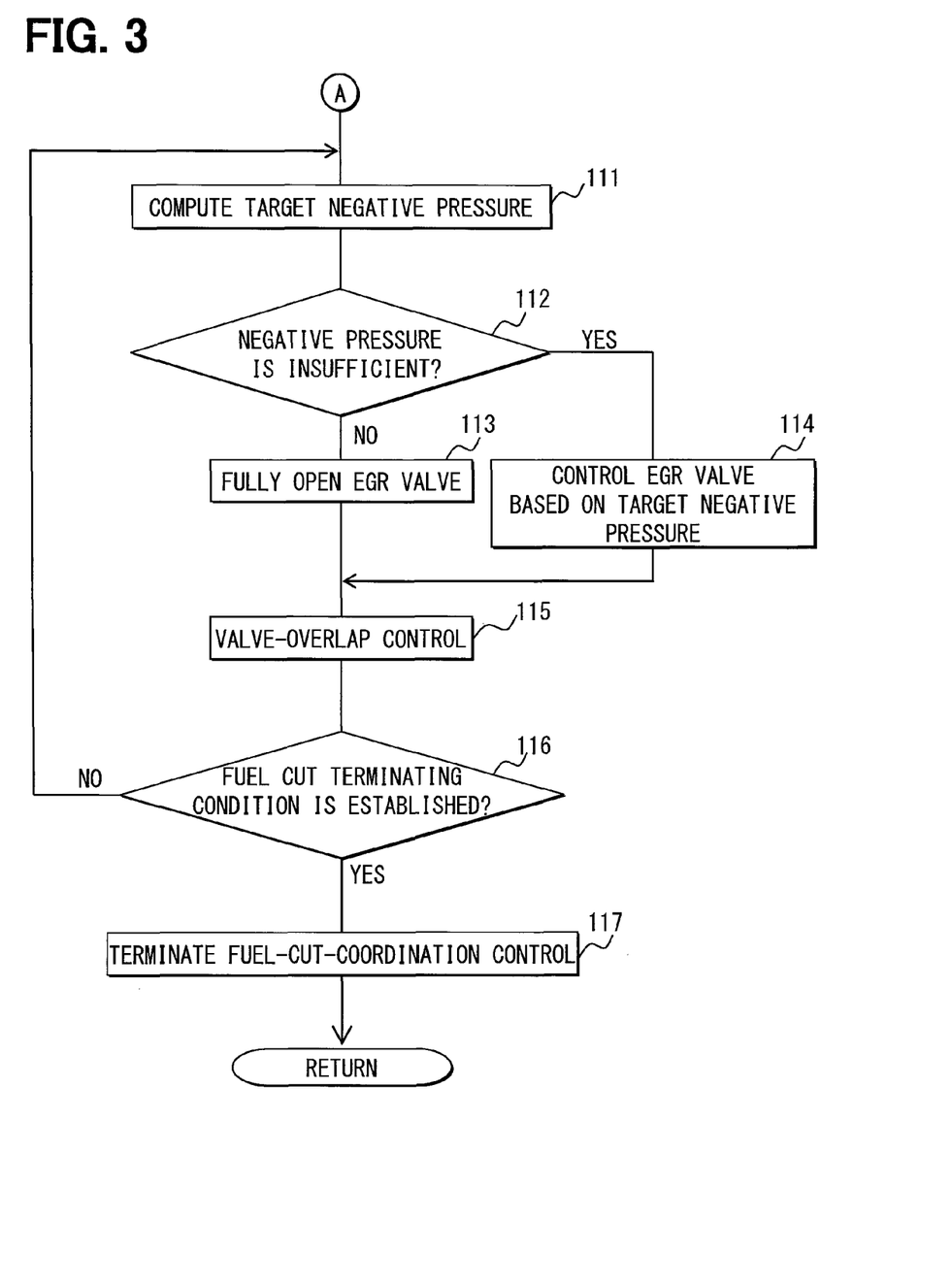
Figure 4:
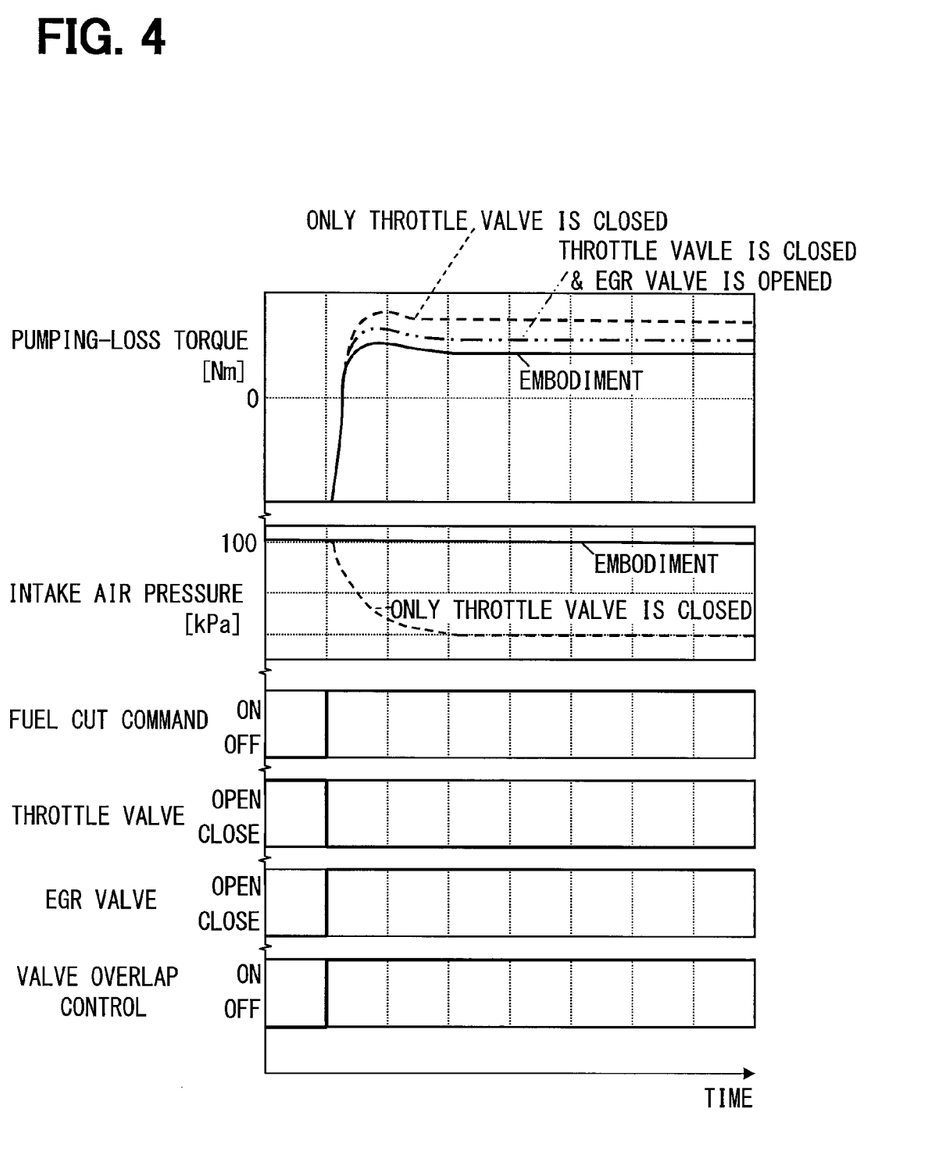
FIG. 4 is a time chart for explaining a pump-loss reduction effect of a fuel-cut-coordination control.

Moreover, according to the first embodiment, in order to improve the energy-regeneration efficiency, the ECU 34 executes a fuel-cut-control routine shown in FIGS. 2 and 3, whereby a fuel-cut-coordination control is executed when the engine 11 is in the fuel cut. In this fuel-cut-coordination control, as shown in FIG. 4, throttle valve 14 is closed, the EGR valve 26 is opened, and the variable valve timing controllers 22, 23 are controlled to reduce the pumping loss of the engine 11. Specifically, in a period from a latter period of the exhaust stroke to a preceding period of the intake stroke, a valve-overlap control is executed so that the intake valve and the exhaust valve are opened. Besides, in the first embodiment, after a throttle-valve-late-close control and an EGR-valve-open-close control are executed, the fuel-cut-coordination control is executed. However, in order to explain an effect of the fuel-cut-coordination control, the fuel-cut-coordination control is executed immediately after the fuel-cut is started in FIG. 4.

When the engine 11 is in the fuel cut, the throttle valve 14 is closed and the EGR valve is opened, so that the EGR gas is re-circulated into the intake pipe 12 and an intake pipe pressure drop can be avoided while cold fresh intake air is not introduced into the engine 11. Thereby, the pumping loss of the engine 11 can be reduced and the temperature decrease of the catalyst 21 can be restricted. Furthermore, in a period from a latter period of the exhaust stroke to a preceding period of the intake stroke, a valve-overlap control is executed so that the variable valve timing controllers 22, 23 are controlled to make both the intake valve and the exhaust valve opened. Thus, a pressure drop in the combustion chamber due to a slide-down of a piston in an intake stroke can be reduced and the pumping loss can be further reduced.

In a case that the throttle valve 14 is closed and EGR valve 26 is opened from immediately after the fuel cut is started, a combustion gas remains in a combustion chamber of the engine 11, the exhaust pipe 19 and the EGR pipe 25. It is likely that an ignitability of the air-fuel mixture may be deteriorated when a fuel injection is started again after the fuel cut is terminated.

In order to avoid the above issue, according to the first embodiment, before performing fuel-cut-coordination control, the throttle-valve-late-close control is executed and then the EGR-valve-open-close control is executed. In the throttle-valve-late-close control, the throttle valve 14 is held at open-condition until a specified delay time Td has passed after the fuel cut is started at a time t1. Then, when the delay time Td has passed at a time t2, the throttle valve 14 is closed. The delay time Td is, for example, a time period which is necessary to scavenge the combusted gas in the combustion chamber and the exhaust pipe 19 between the exhaust valve and a connection portion of the EGR pipe 25. After throttle-valve-late-close control and the EGR-valve-open-close control are executed, the above described fuel-cut-coordination control is performed.

When the engine is in the fuel, the throttle-valve-late-close control is executed so that the throttle valve 14 is held open until the delay time Td has passed, whereby fresh air is suctioned to scavenge the combustion gas in the combustion chamber and the exhaust pipe 19. Then, according to the EGR-valve-open-close control, the EGR valve 26 is repeatedly opened and closed. When the EGR valve 26 is opened, the combustion gas in the EGR pipe 25 is re-circulated to the combustion chamber. When the EGR valve 26 is closed, the combustion gas in the combustion chamber is discharged into the exhaust pipe 19.

Figure 5:
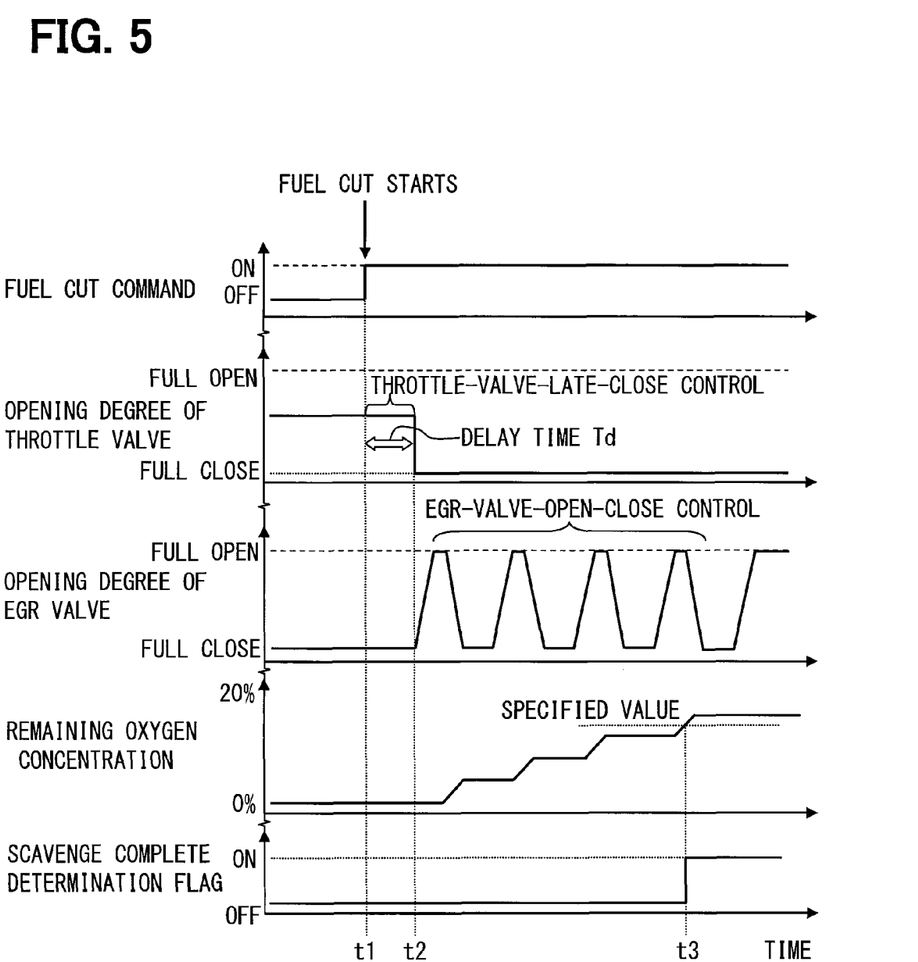
FIG. 5 is a time chart showing a throttle-valve-late-close control and an EGR-valve-open-close control.

Also, according to the first embodiment, as shown in FIG. 5, when the EGR-valve-open-close control is executed, the remaining oxygen concentration (oxygen concentration in exhaust gas) is computed based on the outputs of the air fuel ratio sensor 20. When the remaining oxygen concentration exceeds a specified value at a time t3, the EGR-valve-open-close control is terminated.

Referring to FIGS. 2 and 3, the processes of the fuel-cut-control routine will be described hereinafter.

The fuel-cut-control routine is executed at a specified cycle while the ECU 34 is ON. This fuel-cut-control routine corresponds to a fuel-cut-control portion.

In step 101, the computer determines whether a fuel-cut executing condition is established based on whether an accelerator position is zero and the engine speed is higher than a specified value. When the answer is No in step 101, the routine is finished without performing the subsequent steps.

When the answer is Yes in step 101, the procedure proceeds to step 102 in which the throttle valve 14 is closed and the fuel cut of the engine 11 is executed. In steps 103 to 106, the throttle-valve-late-close control is performed.

In step 103, the computer reads the intake air flow rate detected by the air flow meter 13. In step 104, the computer computes the delay time Td based on the intake air flow rate by using of a map or a mathematical expression. The delay time Td is a time period which is necessary to scavenge the combusted gas in the combustion chamber and the exhaust pipe 19 between the exhaust valve and the connection portion of the EGR pipe 25. Generally, as the intake air flow rate becomes greater, the time period required to scavenge the combustion gas becomes shorter. The map or the mathematical expression is defined in such a manner that as the intake air flow rate becomes greater, the delay time Td becomes shorter. This map or the mathematical expression is previously formed based on experimental data and design data, and is stored in the ROM of the ECU 34.

Besides, the computation method of the delay time Td may be changed suitably. For example, since an intake air flow rate varies according to an air load factor KL and the engine speed Ne, the delay time Td may be computed based on the air load factor KL and the engine speed Ne.

Specifically, according to a following equation, a scavenging flow Qx is obtained by using of a displacement Vcy of the engine 11, the air load factor KL, and the engine speed Ne.

$$Qx = (½) \times Vcy \times KL \times (Ne/60) [cc/sec]$$

Further, according to a following equation, a scavenging volume Vx is obtained by using of the displacement Vcy and an exhaust-pipe volume Ve (a volume of the exhaust pipe 19 between the exhaust valve and the EGR pipe 25).

$$Vx = Vcy + Ve [cc]$$

Then, according to a following equation, the delay time Td is computed by using of the scavenging volume Vx and scavenging flow Qx.

$$Td = Vx/Qx [sec]$$

Figure 6:
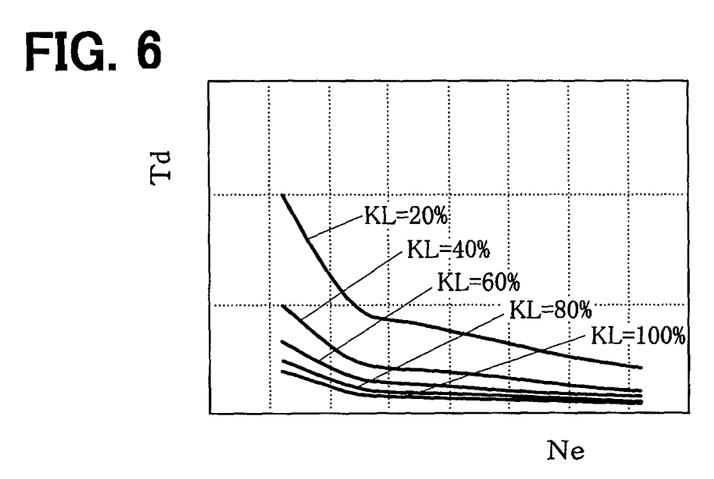
FIG. 6 is a chart conceptually showing a map of a delay time Td.

Alternatively, as shown in FIG. 6, a map defining a relationship between the air load factor KL, the engine speed Ne and the delay time Td is previously formed. Based on the map, the delay time Td may be obtained.

After the delay time Td is computed, the procedure proceeds to step 105 in which the computer determines whether the delay time Td has passed after the fuel cut is started. When the answer is No, the procedure waits with the throttle valve 14 open.

When the answer is Yes in step 105, the procedure proceeds to step 106 in which the throttle valve 14 is fully closed.

Then, the procedure proceeds to step 107 in which the EGR-valve-open-close control is executed. In this EGR-valve-open-close control, the EGR valve 26 is repeatedly switched between a full-open position and a full-close position.

Figure 7:
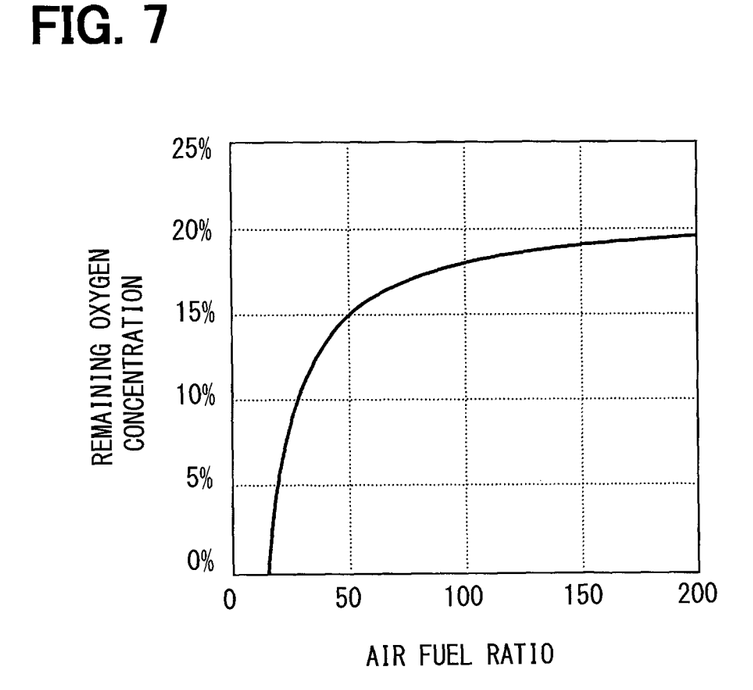
FIG. 7 is a chart conceptually showing a map of a remaining oxygen concentration.

Then, the procedure proceeds to step 108 in which the remaining oxygen concentration is computed based on the outputs of the air-fuel ratio sensor 20 in view of a remaining oxygen concentration map shown in FIG. 7. This remaining oxygen concentration map is previously formed based on experimental data and design data, and is stored in the ROM of the ECU 34.

Then, the procedure proceeds to step 109 in which the computer determines whether the remaining oxygen concentration exceeds a specified value. When the answer is No in step 109, the procedure backs to step 108 in which the remaining oxygen concentration is repeatedly computed based on the outputs of the air-fuel ratio sensor 20.

When the answer is YES in step 109, the procedure proceeds to step 110 in which the EGR-valve-open-close control is terminated and the fuel-cut-coordination control is started.

First, in step 111 (FIG. 3), the computer computes a target negative pressure corresponding to a driving condition of the vehicle according to a map or a mathematical expression. This target negative pressure is a target pressure in the brake booster 31 to obtain a braking force corresponding to the driving condition of the vehicle. The map of the target negative pressure or the mathematical expression is previously formed based on experimental data and design data, and is stored in the ROM of the ECU 34.

Then, the procedure proceeds to step 112 in which the computer determines whether the negative pressure is insufficiently based on whether the detected negative pressure (absolute value) in the brake booster 31 is smaller than the target negative pressure. The negative pressure in the brake booster 31 is detected by a negative pressure sensor 33.

Figure 8:
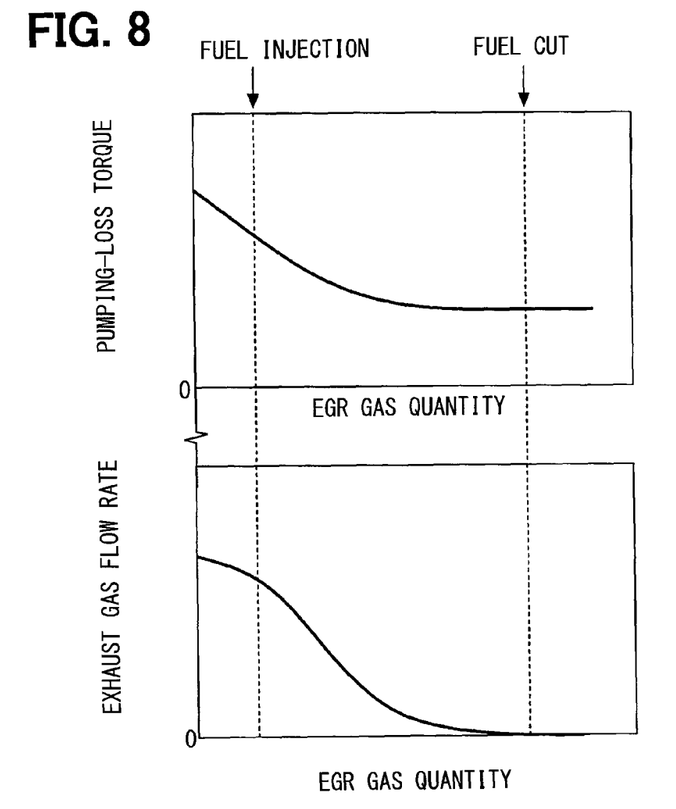
FIG. 8 is a chart showing a relationship between an EGR gas quantity, a pumping-loss torque, and an exhaust gas flow rate.

When the answer is No in step 112, the procedure proceeds to step 113 in which the EGR valve 26 is fully opened with the throttle valve 14 closed. Thereby, as shown in FIG. 8, the EGR gas quantity of when the fuel cut is performed is greater than the EGR gas quantity of when the fuel injection is performed. Thereby, a decrease of the intake air pressure can be effectively restricted and the pumping loss can be effectively reduced.

When the answer is Yes in step 112, the procedure proceeds to step 114 in which the EGR valve 26 is opened with the throttle valve 14 closed and the opening degree of the EGR valve 26 is adjusted so that the intake air pressure becomes the target negative pressure. In this case, a target opening degree of the EGR valve 26 corresponding to the target negative pressure is computed according to a map or a mathematical expression. The opening degree of the EGR valve 26 is adjusted to the target opening degree. Thereby, when the engine is in the fuel cut, the intake air pressure can be controlled to the target negative pressure, and the negative pressure in the brake booster 31 can be made into the target negative pressure. Thus, the negative pressure required to obtain the braking force corresponding to the driving condition of the vehicle is ensured.

Then the procedure proceeds to step 115 in which the valve-overlap control is executed so that the variable valve timing controllers 22, 23 are controlled to make both the intake valve and the exhaust valve opened. Thus, a pressure drop in the combustion chamber due to a slide-down of a piston in an intake stroke can be reduced and the pumping loss can be further reduced.

In the valve-overlap control, the intake-side variable valve timing controller 22 advances a valve timing of the intake valve, and the exhaust-side variable valve timing controller 23 retards a valve timing of the exhaust valve. In this case, a valve close timing of the intake valve is retarded as much as possible in a range where the valve-overlap period is ensured for a specified period.

The valve-overlap period may be defined only by the above operation of the intake-side variable valve timing controller 22. Alternatively, the valve-overlap period may be defined only by the above operation of the exhaust-side variable valve timing controller 23.

Then, the procedure proceeds to step 116 in which the computer determines whether a fuel cut terminating condition is established. Specifically, the computer determines whether an accelerator pedal is stepped or whether the engine speed is decreased less than a specified value.

When the answer is No in step 116, the procedure goes back to step 111 to continue the fuel-cut-coordination control. When the answer is Yes in step 116, the procedure proceeds to step 117 in which the fuel-cut-coordination control is terminated.

According to the above first embodiment, when the engine is at idle, the fuel-cut-coordination control is executed. Thus, the pumping-loss reduction effect by opening the EGR valve 26 and the valve-overlap control is obtained. The pumping loss of the engine 11 is sufficiently reduced and the energy-regenerate efficiency can be effectively improved.

Figure 9:
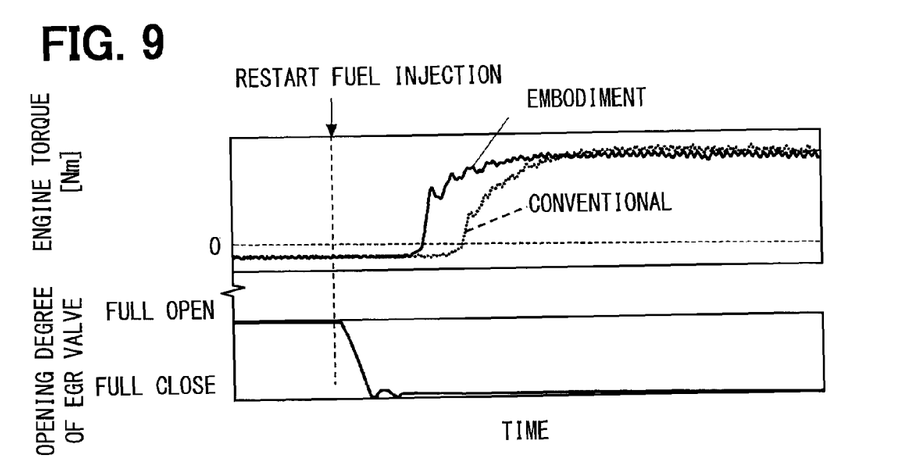
FIG. 9 is a time chart for explaining an ignitability improvement effect of the throttle-valve-late-close control and the EGR-valve-open-close control.

Furthermore, according to the first embodiment, before the fuel-cut-coordination control is performed, the throttle-valve-late-close control and EGR-valve-open-close control are performed. Thus, the combustion gas remaining in the combustion chamber, the exhaust pipe 19 and the EGR pipe 25 can be effectively discharged. Thereby, as shown in FIG. 9, compared with a conventional system in which the throttle-valve-late-close control and the EGR-valve-open-close control are not performed, the ignitability of the air-fuel mixture after the fuel cut and the engine torque is generated early.

Moreover, according to the first embodiment, when it is determined that the negative pressure is not insufficient at the fuel-cut-coordination control, the EGR valve 26 is controlled so that the EGR gas quantity of when the fuel cut is performed is larger than the EGR gas quantity of when a fuel injection is performed. Thus, a decrease of the intake air pressure is restricted and the pumping loss is decreased.

Furthermore, according to the first embodiment, the EGR apparatus 24 has the EGR pipe 25 and the EGR valve 26 of which diameters are made larger. For example, when the EGR valve 26 is fully opened, the intake pipe pressure can be atmospheric pressure. Thus, in the fuel-cut-coordination control, the EGR gas quantity can be increased more than that of when the fuel is injected. The pumping-loss reduction effect can be maximally obtained by opening the EGR valve 26.

Moreover, according to the first embodiment, when it is determined that the negative pressure is insufficient at the fuel-cut-coordination control, the opening degree of the EGR valve 26 is controlled so that the intake air pressure became target negative pressure. Thereby, when the engine is in the fuel cut, the intake air pressure can be controlled to the target negative pressure, and the negative pressure in the brake booster 31 can be made into the target negative pressure. Thus, the negative pressure required to obtain the braking force corresponding to the driving condition of the vehicle is ensured.

The time period necessary to scavenge the combusted gas in the combustion chamber and the exhaust pipe 19 between the exhaust valve and the EGR pipe 25 varies according to the intake air flow rate. According to the first embodiment, in the throttle-valve-late-close control, the delay time Td is computed based on the intake air flow rate. Thus, the delay time Td can be defined to an appropriate value. It can be avoided that the delay time Td becomes longer more than necessary.

Furthermore, in the EGR-valve-open-close control, the remaining oxygen concentration is computed based on the output of the air fuel ratio sensor 20. When the remaining oxygen concentration exceeds the specified value, it is determined that the scavenging of combustion gas is completed, so that the EGR-valve-open-close control is terminated. Thus, it can be avoided that a performing period of the EGR-valve-open-close control becomes longer more than necessary.

Second Embodiment

Figure 10:
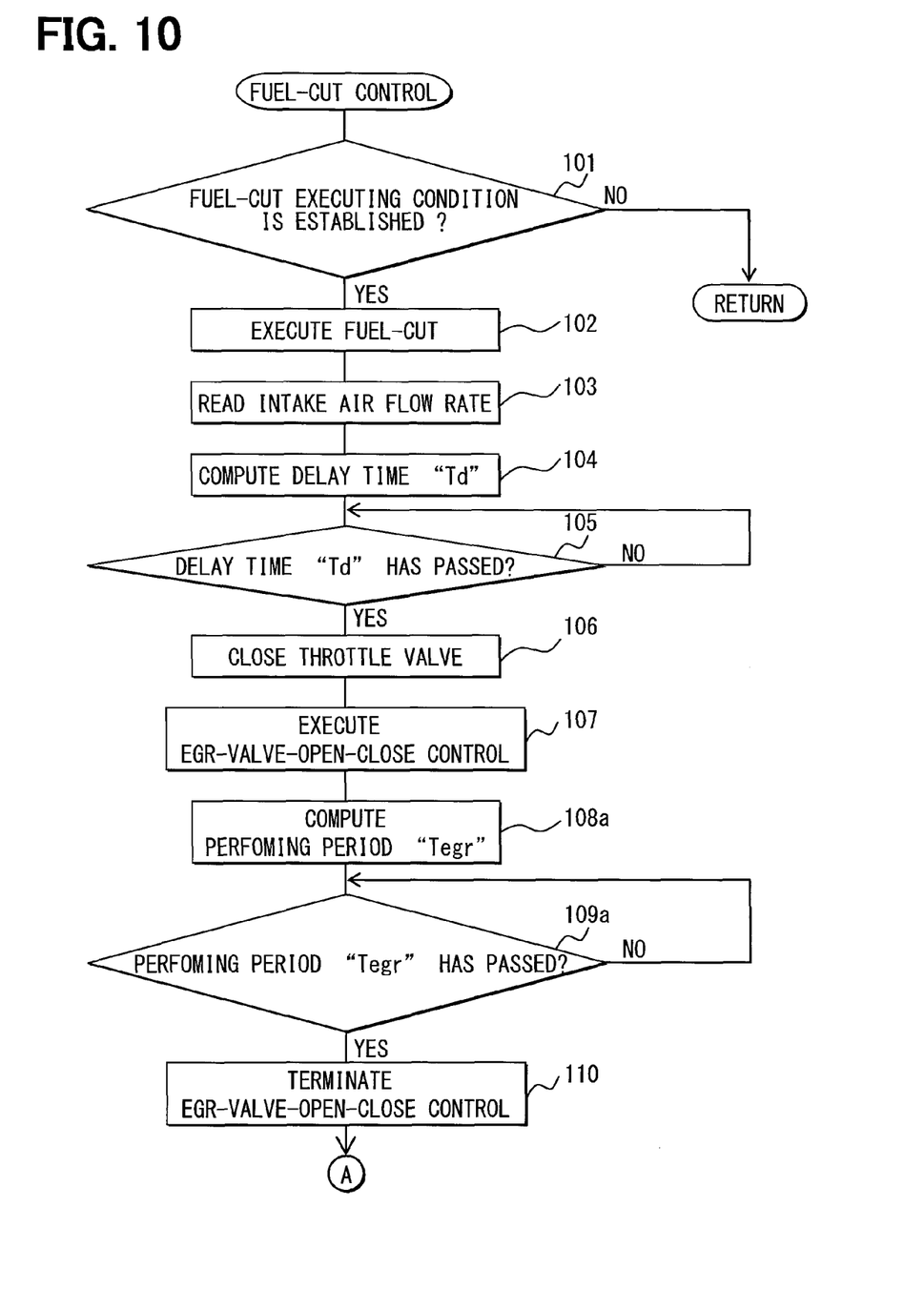
FIG. 10 is a flow chart showing a main processing of a fuel-cut control routine according to the second embodiment.

Referring to FIG. 10, a second embodiment will be described hereinafter. In the second embodiment, the same parts and components as those in the first embodiment are indicated with the same reference numerals and the same descriptions will not be reiterated.

According to the second embodiment, the ECU 34 executes a fuel-cut-control routine shown in FIG. 10. In the EGR-valve-open-close control, a performing period of the EGR-valve-open-close control is computed as follows. That is, a volume of an intake pipe 12 between the throttle valve 14 and intake valve, a volume of the combustion chamber of the engine 11, a volume of the exhaust pipe 19 between the exhaust valve and the inlet of the EGR pipe 25, a volume of the EGR pipe 25 are totalized. The performing period Tegr of the EGR-valve-open-close control is computed based on the above totalized volume and the opening degree of the EGR valve 26. A total of the volume of the intake pipe 12 between the throttle valve 14 and intake valve, the volume of the combustion chamber of the engine 11, the volume of the exhaust pipe 19 between the exhaust valve and the inlet of the EGR pipe 25 is referred to as a throttle-EGR volume.

The process in steps 108 and 109 in FIG. 2 is replaced by processes in steps 108a and 108b in FIG. 10. The other steps in FIG. 10 are the same as those in FIG. 2.

When the computer determines that the fuel-cut executing condition is established in step 11, the fuel cut of the engine 11 is performed in step 102. Then, the throttle-valve-late-close control is performed in steps 103 to 106.

In step 107, the EGR-valve-open-close control is performed. In step 108a, the performing period Tegr of the EGR-valve-open-close control is computed based on the throttle-EGR volume, the volume of the EGR pipe 25, and the opening degree of the EGR valve 26. The performing period Tegr is set to be equal to or little longer than a period which is necessary to scavenge the combustion gas in the EGR pipe 25.

Then, the procedure proceeds to step 109a in which the computer determines whether the performing period Tegr has passed after the EGR-valve-open-close control is started. When the answer is No, the EGR-valve-open-close control is continued.

When the answer is YES in step 109a, the procedure proceeds to step 110 in which the EGR-valve-open-close control is terminated and the fuel-cut-coordination control is started.

According to the above described second embodiment, the performing period Tegr of the EGR-valve-open-close control is established based on the throttle-EGR volume, the volume of the EGR passage 25 and the opening degree of the EGR valve 26. Thus, the performing period Tegr of the EGR-valve-open-close control can be set to an appropriate time. It can be avoided that the EGR-valve-open-close control is performed longer more than necessary.

Besides, although the performing period Tegr of EGR-valve-open-close control is computed based on the throttle-EGR volume, the volume of the EGR passage 25 and the opening degree of the EGR valve 26 in the second embodiment, the performing period Tegr of EGR-valve-open-close control may be computed based on the engine speed or an EGR valve control condition. Alternatively, the performing period Tegr of EGR-valve-open-close control may be set to a predetermined fixed value (for example, a maximum time period required to scavenge the combustion gas in EGR pipe 25).

In the above first and second embodiments, the delay time Td is computed based on the intake air flow rate while the throttle-valve-late-close control is performed. However, the delay time Td may be a predetermined time. For example, the delay time Td is a maximum time period which is necessary to scavenge the combusted gas in the combustion chamber and the exhaust pipe 19 between the exhaust valve and the connection portion of the EGR pipe 25.

Besides, in the above first and second embodiments, after a throttle-valve-late-close control and an EGR-valve-open-close control are executed in the fuel cut, the fuel-cut-coordination control is executed. However, when the ignitability of the air-fuel mixture after the fuel cut is not deteriorated, the throttle-valve-late-close control and the EGR-valve-open-close control may be omitted. Immediately after the fuel cut, the fuel-cut-coordination control may be performed.

In the above first and second embodiments, the engine control system is applied to a vehicle provided with an internal combustion engine. However, the present engine control system can be applied to a hybrid vehicle which is provided with an internal combustion engine and a motor-generator. When the internal combustion engine is in the fuel cut, the motor-generator converts the kinetic energy of the vehicle into the electrical energy.

What is claimed is:

1. A vehicle controller performing an energy regeneration in which a kinetic energy of a vehicle is regenerated by converting the kinetic energy into an electrical energy by an alternator when an internal combustion engine is in a fuel cut, the vehicle controller comprising:
    a throttle valve adjusting an intake air flow rate of the internal combustion engine;
    an EGR apparatus having an EGR valve which controls an exhaust gas quantity re-circulating from an exhaust passage into an intake passage through an EGR passage;
    a variable valve timing controller varying a valve timing of at least one of an intake valve and an exhaust valve of the internal combustion engine; and
    a fuel-cut-control portion performing a fuel-cut-coordination control in which the throttle valve is closed, the EGR valve is opened, and the variable valve timing controller is controlled so that a pumping loss of the internal combustion engine is decreased when the internal combustion engine is in the fuel cut.

2. A vehicle controller according to claim 1, wherein:
    before the fuel-cut-control portion performs the fuel-cut-coordination control, the fuel-cut-control portion performs a throttle-valve-late-close control in which the throttle valve is held at open-condition until a specified delay time has passed after the fuel cut is started and the throttle valve is closed when the specified delay time has passed, and an EGR-valve-open-close control in which the EGR valve is repeatedly opened and closed.

3. A vehicle controller according to claim 1, wherein:
    the fuel-cut-control portion controls the EGR valve so that the exhaust gas quantity in the fuel-cut-coordination control is greater than the exhaust gas quantity of when a fuel injection is performed.

4. A vehicle controller according to claim 1, wherein:
    in the EGR apparatus, an inner diameter of the EGR passage and an outer diameter of the EGR valve are enlarged in order to increase the EGR gas quantity more than those of an EGR apparatus which is used only while a fuel injection is performed.

5. A vehicle controller according to claim 1, wherein:
    when the fuel-cut-coordination control is performed, a valve-overlap control is executed so that the variable valve timing controller is controlled to make both the intake valve and the exhaust valve opened in a period from a latter period of an exhaust stroke to a preceding period of an intake stroke.

6. A vehicle controller according to claim 1, further comprising:
    a negative-pressure type brake booster amplifying a stepping-in force of a brake pedal in order to increase a braking force of a brake by using of a negative pressure in an intake passage of the engine; wherein
    the fuel-cut-control portion computes a target negative pressure based on a driving condition of the vehicle and controls an opening degree of the EGR valve based on the target negative pressure when the fuel-cut-coordination control is performed.

7. A vehicle controller according to claim 2, wherein
    the fuel-cut-control portion computes the specified delay time based on the intake air flow rate of the internal combustion engine or an information correlated with the intake air flow rate when the throttle-valve-late-close control is performed.

8. A vehicle controller according to claim 2, further comprising:
    an air-fuel-ratio sensor detecting an air-fuel ratio of an exhaust gas emitted from the internal combustion engine; wherein:
    the fuel-cut-control portion computes an oxygen concentration in the exhaust gas, and
    when the oxygen concentration exceeds a specified value, the fuel-cut-control portion terminates the EGR-valve-open-close control.

9. A vehicle controller according to claim 2, wherein
    the fuel-cut-control portion computes a performing period of the EGR-valve-open-close control based on a volume of the intake passage between the throttle valve and the intake valve, a volume of a combustion chamber of the internal combustion engine, a volume of the exhaust passage between the exhaust valve and an inlet of the EGR passage, a volume of the EGR passage, and an opening degree of the EGR valve.

* * * * *